US009405689B2

(12) United States Patent
Gole

(10) Patent No.: US 9,405,689 B2
(45) Date of Patent: Aug. 2, 2016

(54) LOCALLY CACHING DATA FROM A SHARED STORAGE

(71) Applicant: MARVELL WORLD TRADE LTD., St. Michael (BB)

(72) Inventor: Abhijeet P. Gole, Cupertino, CA (US)

(73) Assignee: MARVELL WORLD TRADE LTD. (BB)

( * ) Notice: Subject to any disclaimer, the term of this patent is extended or adjusted under 35 U.S.C. 154(b) by 164 days.

(21) Appl. No.: 14/083,508

(22) Filed: Nov. 19, 2013

(65) Prior Publication Data
US 2014/0143506 A1 May 22, 2014

Related U.S. Application Data

(60) Provisional application No. 61/727,893, filed on Nov. 19, 2012.

(51) Int. Cl.
*G06F 13/12* (2006.01)
*G06F 13/38* (2006.01)
*G06F 12/08* (2016.01)
*G06F 9/52* (2006.01)

(52) U.S. Cl.
CPC ............ *G06F 12/0815* (2013.01); *G06F 9/526* (2013.01); *G06F 12/0842* (2013.01); *G06F 12/0868* (2013.01); *G06F 2209/522* (2013.01); *G06F 2212/152* (2013.01)

(58) Field of Classification Search
None
See application file for complete search history.

(56) References Cited

U.S. PATENT DOCUMENTS

| 5,625,795 | A * | 4/1997 | Sakakura et al. ............. 711/148 |
| 6,145,006 | A * | 11/2000 | Vishlitsky ............... G06F 3/062 |
| | | | 709/229 |
| 6,226,717 | B1 * | 5/2001 | Reuter .................... G06F 9/524 |
| | | | 711/147 |
| 7,865,468 | B2 * | 1/2011 | Naineni ........... G06F 17/30132 |
| | | | 707/636 |
| 2004/0230972 | A1 * | 11/2004 | Donovan et al. .................. 718/1 |
| 2005/0223005 | A1 | 10/2005 | Shultz et al. |
| 2005/0273529 | A1 * | 12/2005 | Young ..................... G06F 21/34 |
| | | | 710/58 |
| 2008/0071997 | A1 * | 3/2008 | Loaiza et al. ................. 711/154 |
| 2008/0235474 | A1 | 9/2008 | Hwang et al. |
| 2013/0013844 | A1 * | 1/2013 | Venkatesh ......... G06F 17/30132 |
| | | | 711/6 |

OTHER PUBLICATIONS

Patent Cooperation Treaty (PCT), International Search Report and Written Opinion issued in co-pending PCT International Patent Application No. PCT/US2013/070645 (International Filing Date: Nov. 19, 2013) having a Date of Mailing of Mar. 4, 2014 (8 pgs).

* cited by examiner

*Primary Examiner* — Elias Mamo

(57) ABSTRACT

Systems, methods, and other embodiments associated with controlling when data blocks are cached at hosts from a shared storage are described. According to one embodiment, an apparatus includes a request logic configured to receive, from a first host of a plurality of hosts, a request to cache a data block at the first host. The data block is part of a plurality of data blocks that are stored in a network storage. The network storage is shared by the plurality of hosts. The apparatus also includes a lock logic configured to control access to the data block by issuing a lock for the data block identified by the request in response to determining that the data block is available. The lock provides exclusive access to the data block for the first host to permit the first host to cache the data block locally at the first host.

18 Claims, 3 Drawing Sheets

LOCALLY CACHING DATA FROM A SHARED STORAGE

CROSS REFERENCE TO RELATED APPLICATIONS

This patent disclosure claims the benefit of U.S. Provisional Application Ser. No. 61/727,893 filed on Nov. 19, 2012, which is hereby wholly incorporated by reference.

BACKGROUND

The background description provided herein is for the purpose of generally presenting the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Data is typically stored in primary storage devices such as large capacity disk drives. Primary storage devices are generally slow relative to other forms of storage (e.g., RAM) and thus have high latencies for accessing the stored data. One mechanism for reducing the access time to retrieve data is to use a cache. For example, when the data is part of a shared file system and is accessed over a network connection, caching the data locally at a host can reduce latency when accessing the data. However, when the data is part of the shared file system inconsistencies in the data can arise when two hosts cache the same data and independently alter the data. Accordingly, difficulties may arise when hosts cache data from a shared network storage.

SUMMARY

In general, in one aspect this specification discloses an apparatus. The apparatus includes request logic configured to receive, from a first host of a plurality of hosts, a request to cache a data block at the first host. The data block is part of a plurality of data blocks that are stored in a network storage. The network storage is shared by the plurality of hosts. The apparatus also includes lock logic configured to control access to the data block by issuing a lock for the data block identified by the request in response to determining that the data block is available and not in use by a second host of the plurality of hosts. The lock provides exclusive access to the data block for the first host to permit the first host to cache the data block locally at the first host.

In another embodiment, the lock logic is configured to determine, prior to issuing the lock. The data block is available by analyzing a data mapping to identify a state of the data block. The data mapping indicates which data blocks of the plurality of data blocks are shared, locked, or available.

In another embodiment, a data block that is shared is used by at least two of the plurality of hosts. A data block that is locked is used by one of the plurality of hosts. A data block that is available is used by none of the plurality of hosts.

In another embodiment, the lock logic is configured to deny the lock upon determining that the data block is a shared data block that is accessed by at least two of the plurality of hosts. The data block is shared when the data block provides meta-data describing a file system of the plurality of data blocks. The lock logic is configured to deny the lock to prevent inconsistencies in the data block from multiple hosts writing and accessing the data block.

In another embodiment, the lock logic is configured to revoke a previous lock upon determining the data block is locked as indicated by a data mapping of the plurality of data blocks. The lock logic is configured to revoke, in response to the request from the first host, the previous lock that was previously issued to one of the plurality of hosts for the data block.

In another embodiment, the lock logic is configured to revoke the previous lock to cause the one of the plurality of hosts to write-back the data block to the network storage and to stop caching the data block.

In another embodiment, the request is received by the request logic as a result of a cache miss in the first host. The request logic is configured to communicate using a virtual machine file system (VMFS). The plurality of data blocks are stored in the network storage using the VMFS. The plurality of hosts are virtual machines.

In another embodiment, the apparatus also includes mapping logic configured to (i) generate a data mapping that indicates a state of the plurality of data blocks, and (ii) dynamically update the data mapping, in response to the request, by indicating within the data mapping whether the data block is presently locked, shared or available. The mapping logic is configured to dynamically update the data mapping for the plurality of data blocks as requests are processed to access the plurality of data blocks.

In general, in another aspect, this specification discloses a method. The method includes receiving, in a lock server from a first host of a plurality of hosts, a request to cache a data block at the first host. The data block is part of a plurality of data blocks stored in a network storage. The network storage is shared by the plurality of hosts. The method includes controlling access to the data block by selectively issuing a lock for the data block identified by the request upon determining that the data block is available and not in use by a second host of the plurality of hosts. The lock provides exclusive access to the data block for the first host to permit the first host to cache the data block.

In another embodiment, the method includes, prior to issuing the lock, determining, by at least a hardware component of the lock server, whether the data block is available. Determining whether the data block is available includes analyzing a data mapping that indicates which data blocks of the plurality of data blocks are shared, locked, and available.

In another embodiment, a data block that is shared is used by at least two of the plurality of hosts. A data block that is locked is used by one of the plurality of hosts. A data block that is available is used by none of the plurality of devices.

In another embodiment, the method includes revoking, in response to the request from the first host, a previous lock for the data block. The previous lock was previously issued to one of the plurality of hosts for the data block. Revoking the previous lock occurs upon determining the data block is locked as indicated by a data mapping.

In another embodiment, revoking the previous lock causes the one of the plurality of hosts to write-back the data block to the network storage and to stop caching the data block.

In another embodiment, the method includes denying the lock upon determining that the data block is a shared data block that is accessed by at least two of the plurality of hosts. Denying the lock when the data block is shared prevents inconsistencies in the data block from multiple hosts writing and accessing the data block.

In another embodiment, denying the lock includes denying the lock for the shared data block when the shared data block includes meta-data describing the plurality of data blocks.

In another embodiment, receiving the request includes receiving the request as a result of a cache miss in the first host for the data block. The plurality of data blocks are stored using a virtual machine file system (VMFS). The plurality of hosts are virtual machines.

In another embodiment, the method includes generating a data mapping that indicates a state of the plurality of data blocks. The method also includes dynamically updating the data mapping in response to the request. Dynamically updating the data mapping includes indicating within the data mapping whether the data block is presently locked, shared or available. Dynamically updating the data mapping includes updating the data mapping as requests are processed for each of the plurality of data blocks.

In general, in another aspect, this specification discloses a device. The device includes lock logic configured to determine, in response to a request from a first virtual machine to cache a data block, whether the data block is available for caching by analyzing a data mapping to identify a status of the data block. The data mapping indicates which data blocks of a plurality of data blocks are shared, locked and available. The lock logic is configured to issue a lock to permit the first virtual machine to cache the data block locally. The lock logic is configured to issue the lock in response to determining that the data block is not locked or shared by a second virtual machine.

In another embodiment, the device also includes mapping logic configured to selectively update the data mapping in response to the request by indicating within the data mapping whether the data block is presently locked, shared or available. The mapping logic is configured to selectively update the data mapping for each of the plurality of data blocks as requests are processed to lock data blocks of the plurality of data blocks.

In another embodiment, the mapping logic is configured to reconstruct the data mapping from individual mappings at each of a plurality of virtual machines that include the first virtual machine and the second virtual machine. The individual mappings are mappings of local caches at each of the plurality of virtual machines. The device is configured to communicate using a clustered file system protocol. The plurality of data blocks are stored in a network storage using the clustered file system protocol.

BRIEF DESCRIPTION OF THE DRAWINGS

The accompanying drawings, which are incorporated in and constitute a part of the specification, illustrate various systems, methods, and other embodiments of the disclosure. Illustrated element boundaries (e.g., boxes, groups of boxes, or other shapes) in the figures represent one example of the boundaries. In some examples, one element may be designed as multiple elements or multiple elements may be designed as one element. In some examples, an element shown as an internal component of another element may be implemented as an external component and vice versa.

DETAILED DESCRIPTION

Described herein are examples of systems, methods, and other embodiments associated with a lock server for controlling when data blocks are cached at hosts from a shared storage. For example, the lock server provides a locking mechanism that allows each host in a clustered computing system to exclusively cache individual data blocks in local read/write caches. The present locking mechanism helps to eliminate the situation where multiple hosts cache the same data block and then separately modify the data block causing inconsistencies.

Figure 1:
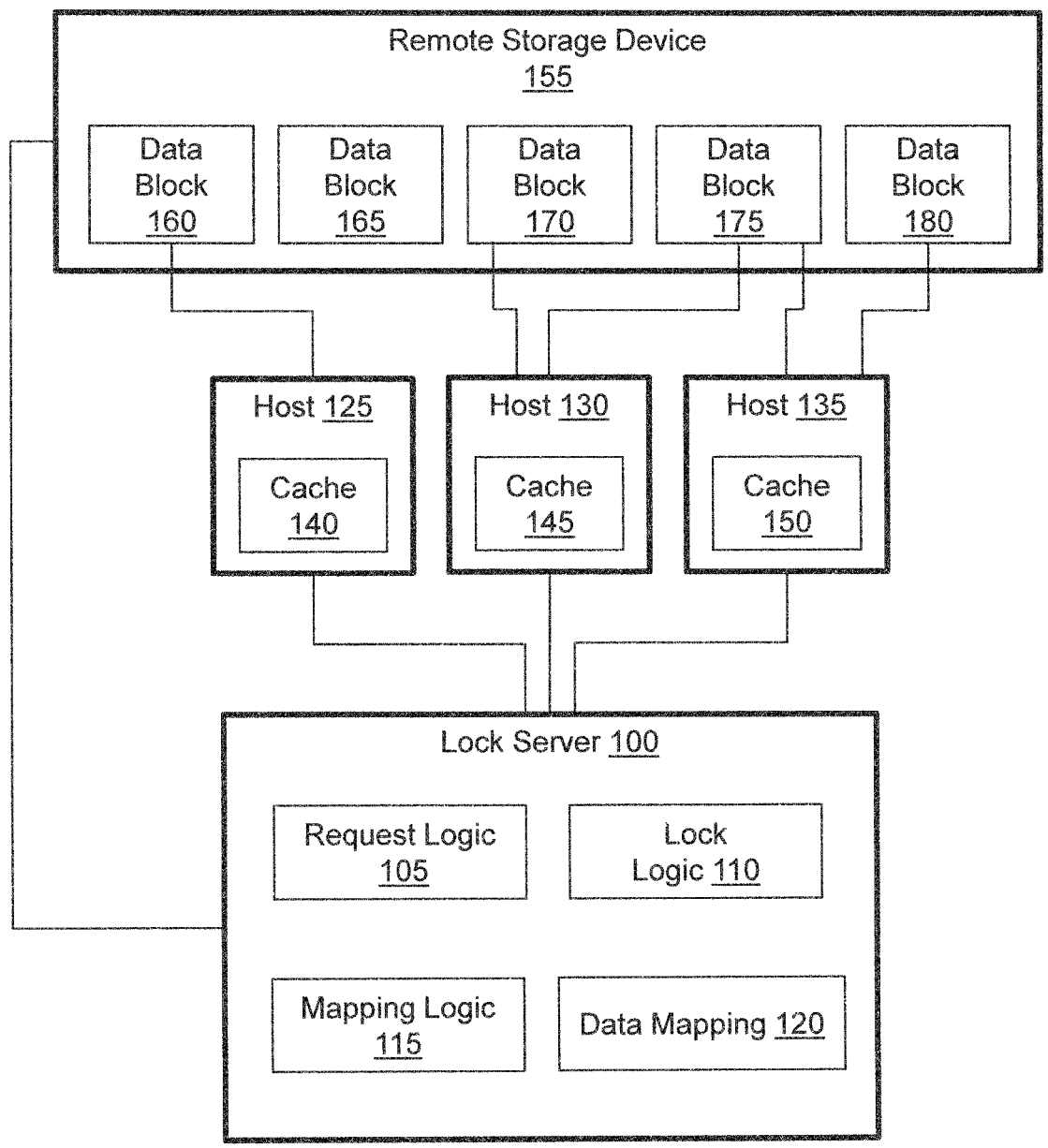
FIG. 1 illustrates one embodiment of an apparatus associated with controlling when data blocks are cached at hosts from a shared storage.

With reference to FIG. 1, one embodiment of a lock server 100 associated with controlling when data blocks are remotely cached is illustrated. The lock server 100 includes request logic 105, lock logic 110, mapping logic 115, and a data mapping 120. Hosts 125, 130, and 135 communicate with the lock server 100 when attempting to cache a data block in a local respective cache 140-150.

A remote storage device 155 stores a plurality of data blocks 160, 165, 170, and 180 (herein after collectively referred to as data blocks 160-180) that are accessible by the hosts 125, 130, and 135. In general, the data blocks 160-180 are portions of data that may include meta-data, file system information, file content, executable programs, and so on. In one embodiment, the remote storage device 155 operates, for example, according to a clustered file system protocol such as virtual machine file system (VMFS) or another clustered file system that provides access to data at the block level. That is, in one embodiment, the remote storage device 155 is a storage area network (SAN) that provides access to the data blocks 160-180 directly as addressable blocks of data.

Furthermore, the data blocks 160-180 may be exclusively accessed by a single host or by two or more hosts. For example, the data block 160 may include data that is particular to the host 125 and thus is only accessed by the host 125. By contrast, the data block 175 may include meta-data or other file system information that is shared and accessed by multiple hosts (e.g., hosts 130-135).

In one example of an environment in which the lock server 100 may operate, consider that a plurality of hosts (e.g., hosts 125-135) share a common storage (e.g., remote storage device 155). In one embodiment, the hosts 125-135 are virtual machines that use the common storage to store various data in the form of data blocks. Additionally, the shared storage is, for example, a network storage device (e.g., a storage area network (SAN)) that uses a clustered file system (e.g., virtual machine file system (VMFS)). Accordingly, the network storage device is remote to the hosts and stores data blocks for the hosts.

Consequently, hosts access the network storage device (e.g., remote storage device 155) over a network. In one example, a host sends requests to the network storage device over the network whenever a read or write occurs for one of the data blocks (e.g., data blocks 160-180). However, accessing the data blocks over the network may increase access latencies for the data blocks. Additionally, accessing the data blocks over the network may also create additional network traffic that can cause network difficulties. Thus, instead of accessing the data blocks over the network, the hosts may cache a copy of one or more of the data blocks locally to improve access latencies and avoid causing additional network overhead.

However, locally caching data blocks shared by a network storage device can cause additional difficulties. For example, inconsistencies within the data blocks can occur when two hosts cache the same data block and modify the data block locally but not at the network storage device. Accordingly, while a host may improve access times and network overhead by caching data blocks locally, difficulties associated with inconsistencies in the data blocks may arise.

Therefore, in one embodiment, the lock server 100 is disclosed that controls when data blocks are cached at hosts. That is, for example, the lock server 100 controls access to the data blocks. In one embodiment, the lock server 100 generates and maintains a data mapping (e.g., the data mapping 120) that indicates which blocks are presently shared, locked or available. Thus, when a host requests to cache one of the data blocks locally, the lock server 100 can control access to the data blocks by selectively issuing a lock to the host. In one embodiment, the lock server 100 issues the lock if the data block is available and not in use by another host as indicated by the data mapping. In this way, the lock server 100 can prevent a host from caching the data block if the data block is shared or in use by another host. Thus, difficulties with two hosts simultaneously caching the same data block and causing inconsistencies within the data block can be avoided.

Accordingly, the data mapping 120 is maintained by the mapping logic 115 to indicate which of the data blocks 160-180 are shared, locked, and available. That is, depending on whether a data block is locked by a single host, shared by multiple hosts, or not presently accessed by any hosts, the mapping logic 115 maintains the data mapping to indicate a state of each of the plurality of data blocks 160-180. In this way, the lock server 100 uses the data mapping 120 to prevent caching of data blocks that are shared or already in use by a host.

While the hosts 125, 130, and 135 are illustrated as being separate from the lock server 100, of course, in other embodiments, the lock server 100 and the hosts 125, 130, and 135 may be embodied within a same device. Furthermore, in still other embodiments, the hosts 125, 130, and 135 may each be different devices along with the lock server 100 being a separate device. The remote storage device 155, the hosts 125, 130, and 135, and the lock server 100 are discussed as being separate devices within this disclosure, however, it should be appreciated that various combinations of devices is possible.

Consider an example where the host 125 attempts to access a data block in the cache 140. When the host 125 attempts to, for example, access the data block (e.g., data block 165) in the cache 140 a cache miss may occur. In general, a cache miss occurs when the data block is not currently cached at the host 125. Accordingly, in response to the cache miss, the host 125 generates a request for the data block 165. The host 125 communicates the request to the lock server 100 over a network. It should be appreciated that the network may take many different forms including a wireless network (e.g., IEEE 802.11 based network, cellular network), a wired network (e.g., Ethernet based network, the Internet), and so on.

The request logic 105 is configured to receive the request from the host 125. Upon receiving the request to cache the data block 165, the lock logic 110 determines whether the data block 165 is available for caching. That is, the lock logic 110 accesses and analyzes the data mapping 120 to determine whether the data block 165 is shared, locked, or available. In general, a data block is shared when the data block is or has been accessed by at least two separate hosts. For example, the data block 175 is a shared data block that is accessed by the host 130 and the host 135. In one embodiment, a data block that is marked as being shared includes meta-data or other file system information that may be accessed by multiple hosts.

Furthermore, a data block is marked as being locked when the data block is being exclusively accessed by a single host (e.g., data blocks 160, 170, 180). In one embodiment, a data block may be locked when a host is caching a copy of the data block locally and not accessing the data block at the remote storage device 155. Otherwise, if a data block is not shared or lock, then the data block is marked as being available. For example, the data block 165 is available since no host is using/accessing the data block 165.

Accordingly, continuing with the example of the request from the host 125, the lock logic 110 determines from the data mapping 120 that the data block 165 is available since the data block 165 is not shared or locked by another host. The lock logic 110 is configured to issue a lock to a host when a data block is available. Consequently, the lock logic 110 issues a lock to the host 125 for the data block 165. The lock permits the host 125 to cache the data block 165 locally at the host 125. Accordingly, the lock provides exclusive access to the data block 165 for the host 125. In this way, the lock permits the host 125 to cache the data block 165 without other hosts (e.g., 130, 135) simultaneously attempting to access/cache the block 165, since the host 125 has exclusive access to the block 165.

Additionally, in one embodiment, the mapping logic 115 is configured to update the data mapping 120 to reflect the lock server 100 issuing a new lock. The mapping logic 115 may also update the data mapping 120 in response to any of the data blocks 160-180 changing a state (e.g., locked to shared). In general, the mapping logic 115 is configured to dynamically update the data mapping 120 whenever one of the data blocks 160-180 changes status as requests are processed. Furthermore, in one embodiment, the mapping logic 115 is configured to update the data mapping 120 to include additional information about which hosts have locks on individual data blocks. In one embodiment, the data mapping 120 may also include information about access patterns by hosts to data blocks, which hosts shared access to different data blocks, access privileges associated with different data blocks, and so on.

Accordingly, the data mapping 120 maps a state and information for each of the plurality of data blocks 160-180. Additionally, as a failsafe, the data mapping 120 may be reconstructed from individual mappings located at the hosts 125, 130, and 135. That is, if the data mapping 120 is deleted or otherwise destroyed, the mapping logic 115 is configured to reconstruct the data mapping 120 from individual mappings at each of the plurality of hosts 125, 130, and 135. For example, the individual mappings map a local cache (e.g., cache 140) of a host (e.g., the host 125).

Additionally, each of the plurality of hosts 125, 130, and 135 maintains an individual mapping of a local cache at the host. Thus, when combined together, the individual mappings include a snapshot of all the information included within the data mapping 120. In this way, information in the data mapping 120 is redundant with information stored among the plurality of hosts 125, 130, and 135. Accordingly, the data mapping 120 may be reconstructed from information stored throughout the plurality of hosts 125, 130, and 135.

Figure 2:
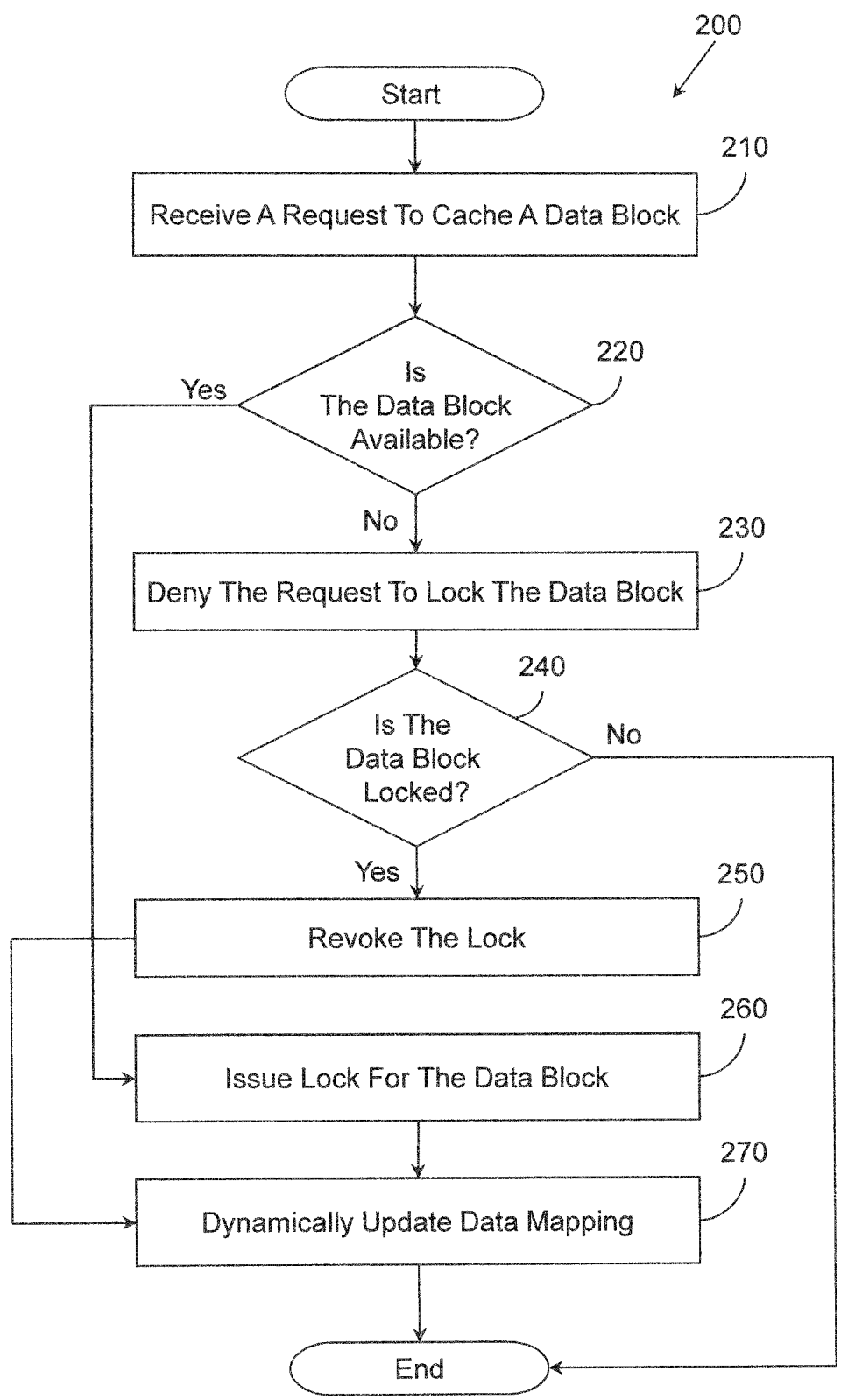
FIG. 2 illustrates one embodiment of a method associated with issuing locks to control caching of data blocks at hosts.

Further details of issuing locks to hosts to permit caching data blocks will be discussed with reference to FIG. 2. FIG. 2 illustrates one embodiment of a method 200 associated with controlling when a data block is cached by a host. FIG. 2 will be discussed from the perspective of a module (e.g., logic that includes at least hardware) that processes requests from a plurality of hosts. The requests are for locks on blocks of data in a shared storage device.

At 210, the module receives a request from a host to cache a data block. As previously discussed, the data block is part of a plurality of data blocks that are stored in a shared storage device (e.g., a SAN). In general, the request is caused by a cache miss of the data block for either a write or a read in a cache of the host. Thus, the host provides the request to obtain exclusive access to the data block so that the host may cache the data block locally instead of accessing the data block at the shared storage device over a network. Furthermore, in one embodiment, the host is a virtual machine that accesses the data block using a clustered file system, such as, a virtual machine file system (VMFS).

At 220, the module determines whether the data block is available. In one embodiment, the module determines whether the data block is available from a data mapping of the plurality of data blocks. That is, the module identifies a state of the data block from the data mapping. In one embodiment, the data mapping indicates which data blocks of the plurality of data blocks are shared, locked, and available.

The data mapping is, for example, a database, tree data structure, hash table, or other data structure that stores meta-data about the plurality of data blocks. The meta-data stored about each of the plurality of data blocks may include a state of the data block (e.g., locked, available, or shared), access patterns, identifiers of which host has locked the data block, and so on. In this way, information indicating a state of each of the plurality of data blocks is available to the module without requiring the module to access the shared storage device to determine the state.

Additionally, in one embodiment, the module generates the data mapping to include a state of each of the plurality of data blocks. That is, for example, the module may dynamically generate the data mapping as requests are processed for each data block. Alternatively, the module may generate the data mapping by scanning and analyzing the shared storage device to determine a state of each of the plurality of data blocks. However, in either case, the data mapping is generated to reflect a state of each of the plurality of data blocks so that locks are not issued for data blocks that are shared.

If, at 220, the module determines that the data block is available, then the lock is issued, at 260, as discussed previously with regard to the host 125 of FIG. 1. Thus, the module controls access to the data block by issuing the lock. That is, the lock provides the requesting host with exclusive access to the data block so that the data block may be cached at the requesting host. However, if the data block is not available, then the module denies the request to lock the data block, at 230.

In general, the request for a lock is denied when the data block is a shared data block that is accessed by at least two hosts or a locked data block that is in use by another host. However, in one embodiment, the lock may also be denied if the data block is meta-data or other file system information that is commonly accessed by multiple hosts, even if the data block has not yet been accessed by multiple hosts. In this way, denying the lock prevents inconsistencies within data blocks from hosts attempting to cache data blocks that are commonly shared and thus are commonly modified by multiple hosts.

At 240, the module determines whether the data block is locked by another host or is already shared. Consider that if the data block was previously locked and another host is requesting access to the block, then the previous lock should be revoked and the data block should be written back to the shared storage device so that a current form of the data block can be accessed by both hosts. However, if the data block was already shared then there is no need to revoke a previous lock since no previous lock exists. Accordingly, in one embodiment, the module accesses and analyzes the data mapping, at 240, to determine a state of the data block (e.g., locked or shared). If the data block was already shared then the method 200 ends.

However, if the data block was locked then, at 250, the lock is revoked. In one embodiment, the lock is revoked by sending a request to a locking host that holds the lock. In this way, the locking host can flush the data block from a local cache and release the lock. Accordingly, the locking host deletes the block from the cache to invalidate a local copy and then accesses the block remotely at the shared storage device.

Additionally, in one embodiment, the locking host may also write-back the current version of the data block prior to deleting the data block. Writing the current version of the data block back to the shared storage device guarantees that an accurate version of the data block is stored by the shared storage device. In this way, revoking the lock and having the data block written back to the shared network storage prevents data from being lost that may have been modified since the data block was originally cached.

After the lock is revoked and released, at 250, the data mapping is dynamically updated, at 270, to reflect a changed state of the data block (e.g., locked to shared). In this way, the data mapping maintains a current status of each of the plurality of data blocks when changes in state occur. Furthermore, the data mapping facilitates preventing multiple hosts from cache a same data block so that inconsistencies are avoided.

Figure 3:
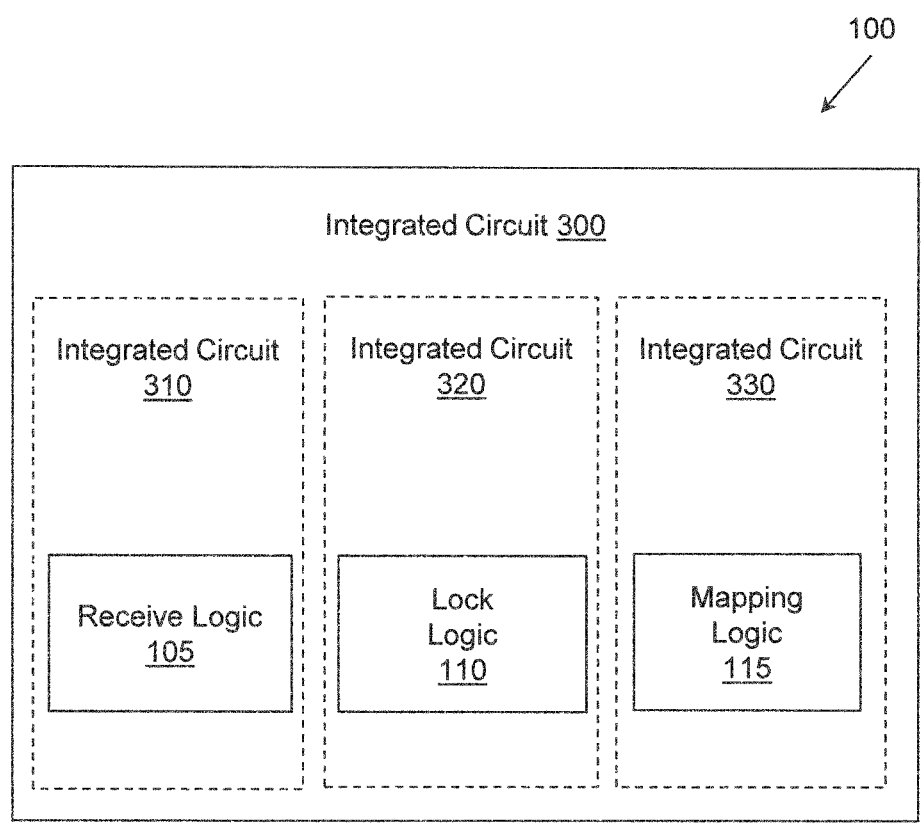
FIG. 3 illustrates one embodiment of an integrated circuit associated with issuing locks for requested blocks of data to be cached at host devices.

FIG. 3 illustrates an additional embodiment of the lock server 100 from FIG. 1 that is configured with separate integrated circuits and/or chips. In this embodiment, the receive logic 105 from FIG. 1 is embodied as a separate integrated circuit 310. Additionally, the lock logic 110 is embodied on an individual integrated circuit 320. The mapping logic 115 is also embodied on an individual integrated circuit 330. The circuits are connected via connection paths to communicate signals. While integrated circuits 310, 320, and 330 are illustrated as separate integrated circuits, they may be integrated into a common integrated circuit board 300. Additionally, integrated circuits 310, 320, and 330 may be combined into fewer integrated circuits or divided into more integrated circuits than illustrated. In another embodiment, the receive logic 105, the lock logic 110, and the mapping logic 115 (which are illustrated in integrated circuits 310, 320, and 330, respectively) may be combined into a separate application-specific integrated circuit. In other embodiments, portions of the functionality associated with the receive logic 105, the lock logic 110, and the mapping logic 115 may be embodied as firmware executable by a processor and stored in a non-transitory memory.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes a module or electrical hardware component(s), firmware, a non-transitory module readable medium that stores instructions, and/or combinations of these components configured to perform a function(s) or an action(s), and/or to cause a function or action from another logic, method, and/or system. Logic may include a microprocessor controlled by an algorithm to perform one or more of the disclosed functions/methods, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic component. Similarly, where a single logic component is described, it may be possible to distribute that single logic component between multiple physical logic components. In some embodiments, one or more of the components and functions described herein are implemented using one or more of the logic components. Logic as described herein is limited to statutory subject matter under 35 U.S.C §101.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks. The methods described herein are limited to statutory subject matter under 35 U.S.C §101.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
   request logic stored in a non-transitory computer-readable medium and including instructions that cause the apparatus to receive, from a first host of a plurality of hosts that are distributed in a network and are remote to the apparatus, a request to cache a data block at the first host by transferring the data block from a network storage to the first host, wherein the data block is part of a plurality of data blocks that are stored in the network storage, and wherein the network storage is a remote storage device that is shared by the plurality of hosts; and
   lock logic stored in a non-transitory computer-readable medium and including instructions that cause the apparatus to control access to the data block by issuing a lock for the data block identified by the request in response to determining that the data block is available and not in use by a second host of the plurality of hosts, wherein the lock provides exclusive access to the data block for the first host to permit the first host to cache the data block locally at the first host,
   wherein the lock logic is configured to revoke, in response to the request from the first host, a previous lock that was previously issued to one of the plurality of hosts for the data block, wherein the lock logic is configured to revoke the previous lock upon determining the data block was locked as indicated by a data mapping and alter the data mapping to indicate the data block is shared and no longer locked.

2. The apparatus of claim 1, wherein the lock logic is configured to determine, prior to issuing the lock, whether the data block is available by analyzing the data mapping to identify a state of the data block, wherein the data mapping indicates which data blocks of the plurality of data blocks are shared, locked, or available.

3. The apparatus of claim 1, wherein a data block that is shared is used by at least two of the plurality of hosts, wherein a data block that is locked is used by one of the plurality of hosts, and wherein a data block that is available is used by none of the plurality of hosts.

4. The apparatus of claim 1, wherein the lock logic is configured to deny the lock upon determining that the data block is a shared data block that is accessed by at least two of the plurality of hosts, wherein the data block is shared when the data block provides meta-data describing a file system of the plurality of data blocks, and wherein the lock logic is configured to deny the lock to prevent inconsistencies in the data block from multiple hosts writing and accessing the data block.

5. The apparatus of claim 1, wherein the lock logic is configured to revoke the previous lock to cause the one of the plurality of hosts to write-back the data block to the network storage and to stop caching the data block.

6. The apparatus of claim 1, wherein the request is received by the request logic as a result of a cache miss in the first host, wherein the request logic is configured to communicate using a virtual machine file system (VMFS), wherein the plurality of data blocks are stored in the network storage using the VMFS, and wherein the plurality of hosts are virtual machines.

7. The apparatus of claim 1, further comprising:
   mapping logic stored in a non-transitory computer-readable medium and including instructions that cause the apparatus to (i) generate the data mapping that indicates a state of the plurality of data blocks, and (ii) dynamically update the data mapping, in response to the request, by indicating within the data mapping whether the data block is presently locked, shared or available, and wherein the mapping logic is configured to dynamically update the data mapping for the plurality of data blocks as requests are processed to access the plurality of data blocks.

8. A method, comprising:
   receiving, in a lock server from a first host of a plurality of hosts that are distributed in a network and are remote to the lock server, a request to cache a data block at the first host by transferring the data block from a network storage to the first host, wherein the data block is part of a plurality of data blocks stored in the network storage, and wherein the network storage is a remote storage device that is shared by the plurality of hosts;
   controlling access to the data block by selectively issuing a lock for the data block identified by the request upon determining that the data block is available and not in use by a second host of the plurality of hosts, wherein the lock provides exclusive access to the data block for the first host to permit the first host to cache the data block; and
   revoking, in response to the request from the first host, a previous lock for the data block that was previously issued to one of the plurality of hosts, and wherein revoking the previous lock occurs upon determining the data block is locked as indicated by a data mapping and that the data block is to be shared and no longer locked.

9. The method of claim 8, further comprising:
prior to issuing the lock, determining, by at least a hardware component of the lock server, whether the data block is available, wherein determining whether the data block is available includes analyzing the data mapping that indicates which data blocks of the plurality of data blocks are shared, locked, and available.

10. The method of claim 8, wherein a data block that is shared is used by at least two of the plurality of hosts, wherein a data block that is locked is used by one of the plurality of hosts, wherein a data block that is available is used by none of the plurality of devices.

11. The method of claim 8, wherein revoking the previous lock causes the one of the plurality of hosts to write-back the data block to the network storage and to stop caching the data block.

12. The method of claim 8, further comprising:
denying the lock upon determining that the data block is a shared data block that is accessed by at least two of the plurality of hosts, wherein denying the lock when the data block is shared prevents inconsistencies in the data block from multiple hosts writing and accessing the data block.

13. The method of claim 12, wherein denying the lock includes denying the lock for the shared data block when the shared data block includes meta-data describing the plurality of data blocks.

14. The method of claim 8, wherein receiving the request includes receiving the request as a result of a cache miss in the first host for the data block, wherein the plurality of data blocks are stored using a virtual machine file system (VMFS), wherein the plurality of hosts are virtual machines, and wherein selectively issuing the lock for the data block causes the first host to retrieve the data block from the network storage.

15. The method of claim 8, further comprising:
generating the data mapping that indicates a state of the plurality of data blocks; and
dynamically updating the data mapping in response to the request, wherein dynamically updating the data mapping includes indicating within the data mapping whether the data block is presently locked, shared or available, and wherein dynamically updating the data mapping includes updating the data mapping as requests are processed for each of the plurality of data blocks.

16. A device comprising:
lock logic stored in a non-transitory computer-readable medium and including instructions that cause the device to determine, in response to a request from a first virtual machine to cache a data block, whether the data block is available for caching by analyzing a data mapping to identify a status of the data block, wherein the data mapping indicates which data blocks of a plurality of data blocks are shared, locked and available,
wherein the lock logic is configured to issue a lock to permit the first virtual machine to cache the data block locally, and wherein the lock logic is configured to issue the lock in response to determining that the data block is not locked or shared by a second virtual machine, wherein the first virtual machine and the second virtual machine are distributed in a network and are remote to the device,
wherein the lock logic is configured to revoke a previous lock for the data block in response to the request when the data block was previously locked by one of the plurality of hosts, and wherein revoking the previous lock occurs upon determining the data block is locked as indicated by the data mapping and that the data block is to be shared and no longer locked.

17. The device of claim 16, further comprising:
mapping logic stored in a non-transitory computer-readable medium and including instructions that cause the device to selectively update the data mapping in response to the request by indicating within the data mapping whether the data block is presently locked, shared or available, wherein the mapping logic is configured to selectively update the data mapping for each of the plurality of data blocks as requests are processed to lock data blocks of the plurality of data blocks.

18. The device of claim 17, wherein the mapping logic is configured to reconstruct the data mapping from individual mappings at each of a plurality of virtual machines that include the first virtual machine and the second virtual machine, wherein the individual mappings are mappings of local caches at each of the plurality of virtual machines, wherein the device is configured to communicate using a clustered file system protocol, and wherein the plurality of data blocks are stored in a network storage using the clustered file system protocol.

\* \* \* \* \*